Oct. 31, 1950     A. VAN RYAN ET AL     2,528,194
CIRCUIT TESTING REPEATING CIRCUIT BREAKER

Filed Jan. 13, 1949     2 Sheets—Sheet 1

INVENTORS
Anthony Van Ryan,
BY Max Rigert

Arthur R. Woolford
Attorney

Oct. 31, 1950     A. VAN RYAN ET AL     2,528,194
CIRCUIT TESTING REPEATING CIRCUIT BREAKER

Filed Jan. 13, 1949     2 Sheets-Sheet 2

INVENTORS.
Anthony Van Ryan,
BY Max Rigert.
Arthur R. Woolfolk
Attorney

Patented Oct. 31, 1950

2,528,194

UNITED STATES PATENT OFFICE 2,528,194

CIRCUIT TESTING REPEATING CIRCUIT BREAKER

Anthony Van Ryan, South Milwaukee, and Max Rigert, Milwaukee, Wis., assignors to McGraw Electric Company, a corporation of Delaware Application January 13, 1949, Serial No. 70,756

4 Claims. (Cl. 175—294)

This invention relates to a circuit testing repeating circuit breaker.

Objects to this invention are to provide a novel form of circuit breaker which, though it is capable of being used in direct current circuits in certain forms of the invention, is nevertheless primarily intended as a circuit breaker for alternating current systems.

Further objects are to provide a circuit breaker which is so made that after opening under overload it will ascertain the condition of the load circuit by testing or probing such circuit to find out if there still exists an overload condition before the load circuit is again directly connected to the supply circuit by means of the self-closing circuit interrupter, which does not depend upon the balancing of voltages or currents, and which has no special relays or coils for ascertaining the condition of the load circuit but which utilizes its own trip coils to prevent the closing of the circuit breaker when the impedance of the load circuit is below a certain predetermined value.

More specifically, objects of this invention are to provide a self-closing circuit breaker which is so constructed that the circuit breaker closes a testing or probing circuit prior to closing the main circuit, and in which this probing circuit includes the trip coils and the load circuit, and which is so arranged that a reduced current is allowed to flow through the load circuit, such current being sufficient to actuate the trip coils in the event that a fault or other overload exists in the load circuit, and in which the actuation of the trip coils under these conditions opens the testing or probing circuit and also deenergizes or renders ineffective the closing means of the circuit breaker.

Further objects are to provide a circuit breaker having the above enumerated characteristics in which a delayed action means is provided for the probing or testing means and in which after the delayed action testing or probing means has functioned a predetermined number of times in a predetermined interval, means are provided which permanently lock the circuit breaker in open position and also prevent further functioning of the testing or probing means.

Further objects are to provide, in one form of the invention, a circuit breaker which is particularly suitable for use in a polyphase alternating current system and which is so constructed that means are provided for testing or probing the polyphase circuit for either a phase to phase fault or a phase to ground fault, and in which tripping means are provided responsive to either of these types of faults which will cause the circuit of an automatic closing means and of a probing means as well as the main load circuit to remain permanently open, after a succession of rapidly occurring operations, until the circuit breaker is reset.

Embodiments of the invention are shown in the accompanying drawings, in which.

Figure 1:
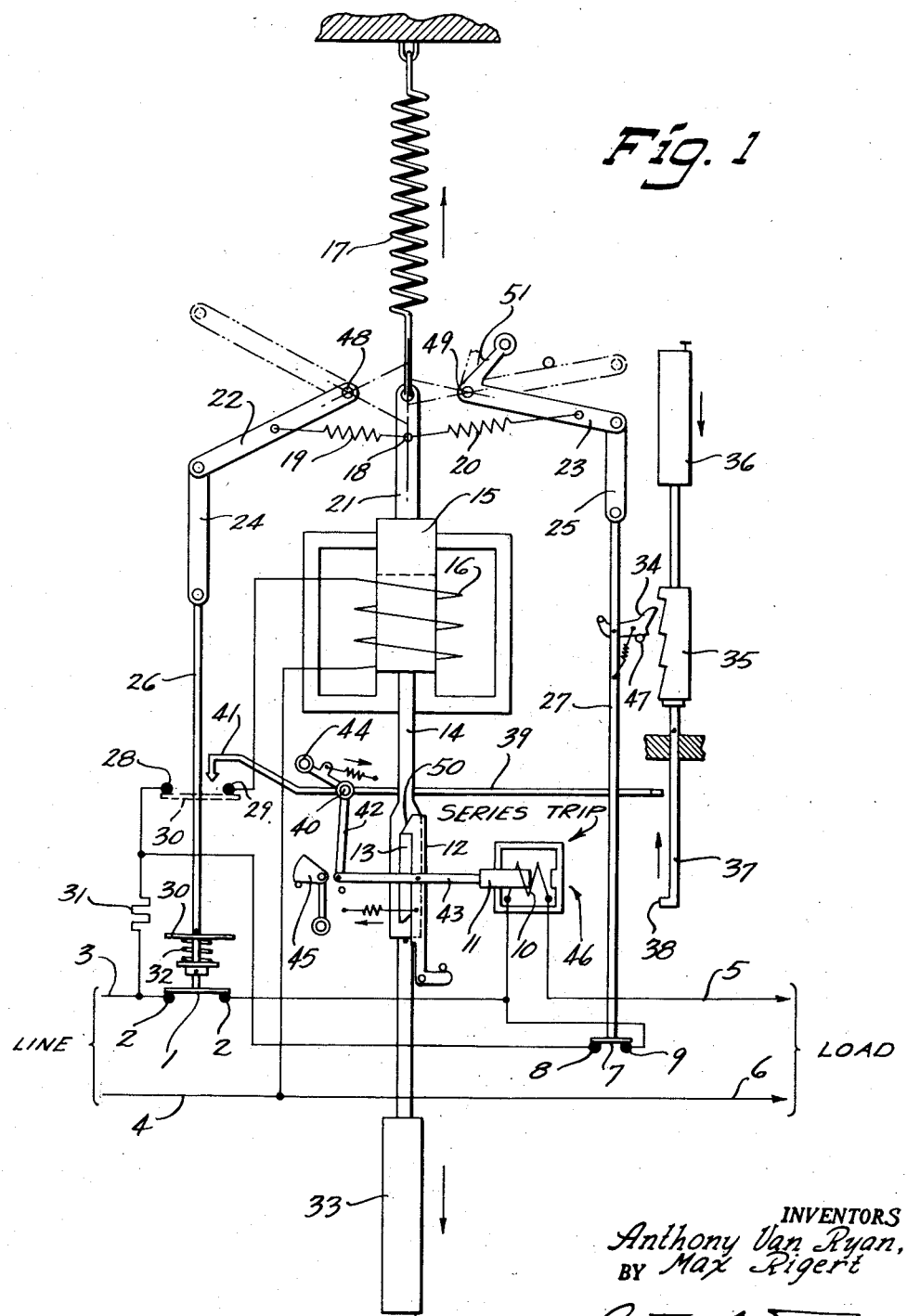
Figure 1 is a view of one form of circuit breaker, such view being generally diagrammatic and being illustrative of a type of circuit breaker which is suitable either for direct current or single phase alternating current.

Referring to Figure 1 it will be seen that the circuit breaker comprises a main movable contact 1 adapted to cooperate with the two stationary contacts 2 and arranged in one side of the power line 3, 4, the load line being illustrated by the reference characters 5 and 6. An auxiliary movable contact is indicated by the reference character 7 and this auxiliary movable contact cooperates with stationary contacts 8 and 9. A series trip coil is indicated by the reference character 10 and is arranged in the load circuit and is designed to draw a magnetic plunger 11 to the right as illustrated in Figure 1 and to thus release a spring pressed latch member 12. This spring latch member 12 normally engages a shouldered portion 13 carried by the reciprocating rod 14 attached to the reset plunger 15. The reset coil is indicated at 16. A retracting spring 17 is provided for moving the rod 14 and plunger 15 to circuit breaker open position. Under these conditions it will be seen that the point 18 of the springs 19 and 20, which are attached to an extension or rod 21 of the plunger 15, is moved upwardly past dead center with reference to the main and auxiliary levers 22 and 23, respectively. These levers are connected by means of suitable links 24 and 25 with switch controlling rods 26 and 27 respectively connected to the main movable contact 1 and the auxiliary contact 7.

It is to be noted that in the drawings no attempt has been made to indicate the insulation for the various portions of the switch mechanism, suitable insulation of course being provided in all cases in accordance with the usual practice. Further, it is to be noted that no guide means has been shown as any suitable type of guide means could be employed for the several movable members. It is to be noted that a pair of stationary contacts 28 and 29 are provided in spaced relation to the stationary contacts 2, 2. These contacts 28 and 29 are adapted to be closed under a predetermined condition hereinafter described by means of the movable contact 30 of the resetting switch means which in turn controls the resetting coil 16. The resetting coil 16 is connected in a local circuit across the supply mains or lines 3, 4 and in series with an impedance 31 to limit the voltage impressed on the coil 16. It is to be noted that the reset switch 30 is spring pressed by means of the spring 32, so as to yieldingly engage the stationary contacts 28 and 29 when the circuit breaker is to be reset for a purpose explained hereinbelow.

It is to be noted that the rod 14 continues downwardly and passes into a time delay means indicated generally by the reference character 33 which delays the downward motion of the rod 14 and consequently the downward motion of the reset plunger as viewed in Figure 1.

It is to be noted further that the auxiliary, probing, or testing switch 7 is connected to a pawl 34 which coacts with a ratchet bar or member 35. This ratchet bar or member 35 is connected to a suitable time delay means 36 which delays the downward or reset motion of such ratchet bar 35. The ratchet bar 35 constitutes an integrating or counting member. It is provided with a lower extension 37 having a shouldered portion 38. It is to be noted from the description thus far given that each time the plunger 15 moves upwardly, that the pawl 34 will advance the ratchet bar 35 one notch upwardly and such operation will continue until the shouldered portion 38 of the counting mechanism engages the end of a lever 39 pivoted as indicated at 40 and integral with an extension or lever 41 and a second extension or lever 42. The lever 42 is connected by means of a link 43 with the series trip plunger 11. The lever 39 is also rigid with a manually operable trip lever 44. It is to be noted that the lever 41 is arranged when moved downwardly as viewed in Figure 1, to open the reset switch means by depressing the reset movable switch member 30. If desired, a manual lock-out cam or other means indicated generally by the reference character 45 may be provided so that the circuit breaker may be manually locked in open position against closing.

The operation of the device is as follows:

Assuming that the parts are in the position shown in Figure 1, it will be seen that when an overload occurs the overload trip means indicated generally by the reference character 46 will be sufficiently energized and will detach the latch 12 from the main rod or operating rod 14. The spring 17 will immediately move the rod 14, the plunger 15 and the extension or rod 21 upwardly. This will carry the point 18 of the springs 19 and 20 past the pivot points 48 and 49 of the main and auxiliary levers 22 and 23 and will cause a quick opening of both the main switch 1 and the auxiliary or testing or probing switch 7. This opens the main circuit from the supply mains 3 and 4 to the load mains or load lines 5 and 6. Shortly thereafter an auxiliary circuit is established by the movable portion 30 of the closing switch. This auxiliary circuit includes the resistance or impedance 31 and leads through the resetting coil 16 and draws the plunger 15 downwardly. The plunger 15, however, has a slow downward motion due to the time delay means 33. A second auxiliary circuit, when the testing switch 7 closes, extends through the resistance 31 and the series trip coil 10 and the load circuit. However, a reduced voltage is impressed on the load circuit because of the resistance 31. Obviously, if desired, a choke could be employed in place of the resistance 31 if the device was used in an alternating current circuit, all that is required being that a suitably reduced voltage be impressed on the load circuit and that the current to the load circuit pass through the series trip coil 10 when the movable member 7 of the testing or auxiliary switch is in switch closed position.

As stated hereinabove, the closing coil 16 of the circuit breaker causes a slow descent of the plunger 15 and it is to be noted that the spring 20 is carried across dead center of the auxiliary lever 23 prior to the time that the spring 19 is carried across dead center of the main lever 22. Under these conditions, the movable contact 30 of the closing switch will remain closed and the movable member 7 of the testing or auxiliary switch will snap closed. This closing of the auxiliary switch, it will be seen, completes the auxiliary circuit through the voltage dropping impedance 31 and the series coil 10 and connects such series coil under reduced voltage conditions to the load circuit 5, 6.

If the overload or fault persists or, in other words, if the impedance of the load circuit is too small, sufficient current will flow through the series coil 10 to cause the plunger 11 to move to the right and cause the lever 41 to depress the movable portion 30 of the closing switch. This occurs before the main switch 1 has closed and consequently only a reduced voltage is impressed on the load circuit during this entire testing period. As soon as the closing switch is opened it is apparent that the plunger 15 will quickly move to its uppermost or switch open position and will open the auxiliary or testing switch. This causes the integrating means or ratchet bar 35 to move upwardly another notch.

It is obvious that if the overload or fault has cleared, that on the next downward motion of the plunger 15 the testing circuit through the series coil will first be closed but will not cause the plunger 11 to move to the right as viewed in Figure 1 and will not move the movable member 30 of the closing switch to switch open position. Consequently, the plunger 15 will continue its downward motion and the latch 12 will latch the plunger 15 in its lowermost or switch closed position and the spring 19 will pass dead center with reference to the main lever 22 and will consequently cause closing of the main switch and apply full line voltage to the load. If, however, the overload or fault persists the circuit breaker will continue to repeatedly close the testing circuit without connecting the load circuit directly to the supply mains and consequently the integrating means will be advanced upwardly as viewed in Figure 1 until the shoulder 38 engages the lever 39 and holds the closing switch 30 of the circuit breaker closing means permanently in open position. Under these conditions, the circuit breaker is locked open and the integrating means cannot now move further upwardly.

It is to be noted that under conditions other than permanent overload or permanent fault, the auxiliary rod 27 returns to its lowermost position and the pawl 34 is moved upwardly out of engagement with the rack 35 by striking the stop 47. This allows the ratchet or integrating means 35 to settle downwardly as previously described. It is to be noted also that when the latch 12 again engages the shouldered portion 13, that such shouldered portion rides over the cam-shaped slanting upper face 50 of the latch 12 and moves into position to be engaged and latched by the latch 12.

If the circuit breaker has been locked in open position due to a continued overload or fault, it is apparent that any suitable means could be employed for resetting it. For example, a manually operable lever 51 rigid with the auxiliary lever 23 could be provided. This lever 51 when depressed would depress the lever 23 and release the pawl 34 from engagement with the rack 35 of the integrating means, the rack 35, being biased downwardly in any suitable manner, would descend and the closing switch 30 would be allowed to close. The circuit breaker would now close and if there was no overload, would remain closed and the integrating means would settle to its lowermost position.

The device illustrated in Figure 1 can be employed for either a single phase alternating current circuit or for a direct current circuit.

Figure 2:
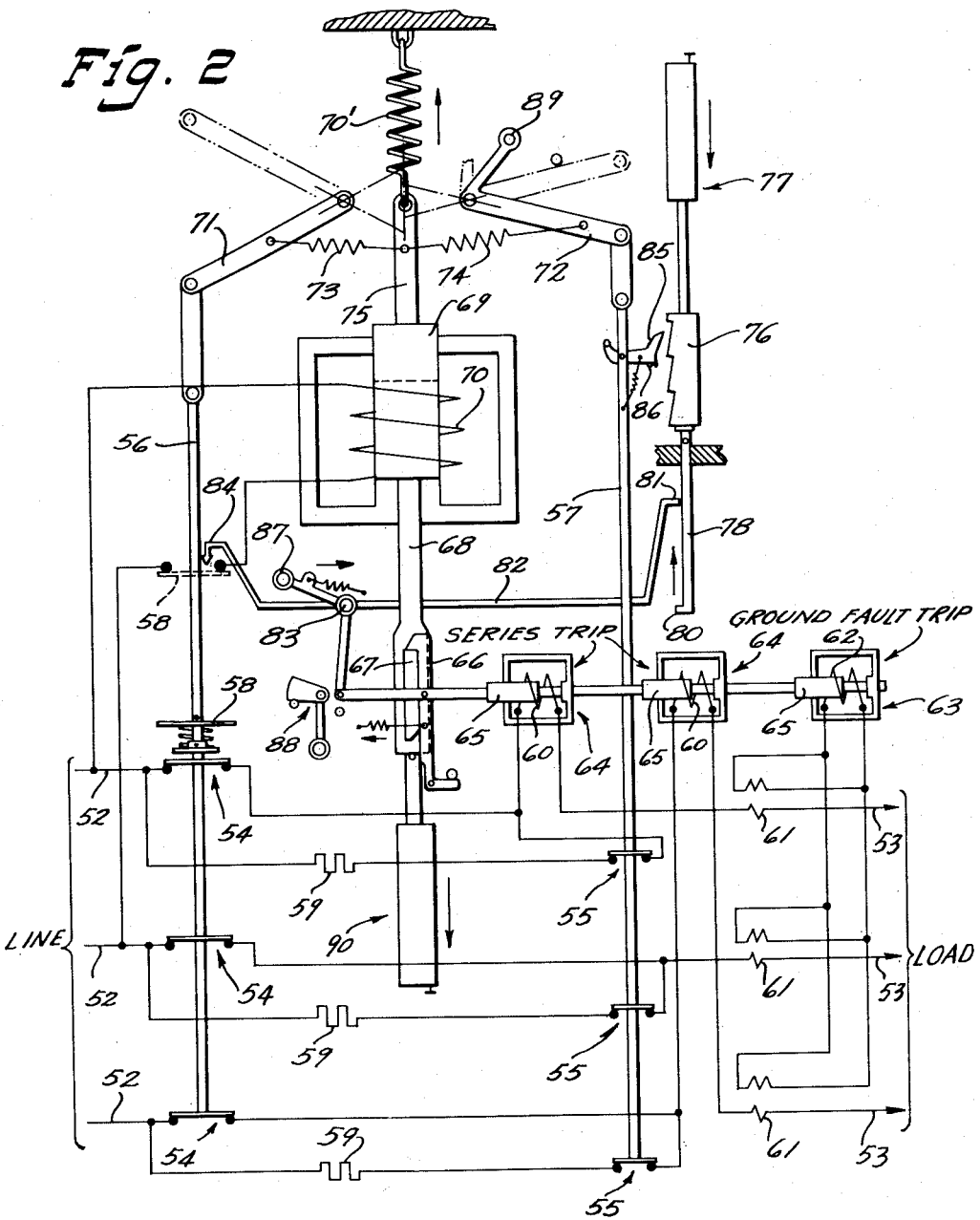
Figure 2 is a similar view of another form of circuit breaker which is designed for a three phase alternating current system.

The device may be readily adapted for use in a polyphase alternating current circuit as shown for the form of the invention illustrated in Figure 2. In this form of the invention the supply mains or supply lines are indicated by the reference character 52 and the load mains or load circuit by the reference character 53. Three main switches, indicated generally by the reference character 54 and three auxiliary or testing or probing switches indicated generally by the reference character 55, are employed. The main switch operating rod is indicated at 56 and the auxiliary switch operating rod at 57. The movable portion of the closing switch is indicated by the reference character 58.

Suitable impedances 59, either in the form of resistors or chokes, are connected in front of the main switches 54 directly to the supply mains 52 and to one side of the auxiliary switches 55. The arrangement of each individual test circuit is the same as that previously described in that a reduced voltage is impressed on each phase of the load circuit. This load circuit, when the auxiliary switches are closed and the main switches are opened, extends through the impedances 59 and the auxiliary switches 55 and through two of the series trip coils 60 for two of the phases and through the primary of each of the current transformers 61 whose secondaries are connected in parallel to the trip coil 62 of the ground fault trip indicated generally at 63. The series trip means are indicated generally by the reference character 64. It is to be noted that the ground fault trip means 63 constitutes a zero sequence relay as it is supplied from the parallel connected secondaries of the current transformers 61.

Each of the trip means 64 and 63 is provided with a plunger 65 and the plungers are all connected to the latch 66, similar to the latch 12 previously described. This latch normally latches the shouldered portion 67 of the operating rod 68 of the plunger 69. The plunger is constantly urged upwardly by means of a biasing spring 70' and is adapted to be moved downwardly into switch closed position by means of the cooperating coil 70 when the movable portion 58 of the closing switch is in switch closing position in exactly the same manner as hereinabove described. A main and an auxiliary lever indicated at 71 and 72 are connected respectively to the main switch rod 56 and the auxiliary switch rod 57. These main and auxiliary levers are operated by means of over-center springs 73 and 74 connected to the rod 75 projecting upwardly from the operating plunger 69. The action of the main and auxiliary levers 71 and 72 is identically the same as that previously described.

It is to be noted that the integrating rack 76 of the integrating means is delayed in its downward settling motion by means of the time delay means indicated generally at 77 and is provided with a downwardly extending rod 78 having a shouldered portion 80 adapted to engage a foot 81 of a lever 82 pivoted as indicated at 83. This lever is provided with means 84 arranged to depress the movable portion 58 of the closing switch when the integrating means is at the uppermost limit of its stroke and to thus lock the circuit breaker in open position. It is to be noted that a pawl 85 is carried by the auxiliary rod 57 and coacts with a suitable stop 86 to withdraw the pawl from the rack 76 when the auxiliary rod 57 is in its lowermost position as shown.

Manual means 87 are provided for manually tripping the circuit breaker and, if desired, manually operable lock means indicated generally by the reference character 88 are provided for manually locking the circuit breaker in open position in a manner similar to that previously described. Also manually operable reset means 89 are provided in the form of a lever rigid with the auxiliary lever 72 as previously described.

Time delay means indicated generally at 90 are provided for delaying the downward motion of the reset plunger 69.

When an overload occurs due to a phase to phase fault, one or the other of the series trip means 64 will be energized and will cause the circuit interrupter to open. If a phase to ground fault occurs, the zero sequence relay tripping means 63 will operate to trip the circuit interrupter due to the unbalance of the phases in a well known manner.

It is clear that the counting, the testing, the lockout and reset operations of this circuit interrupter are similar to those previously described.

Figure 3:
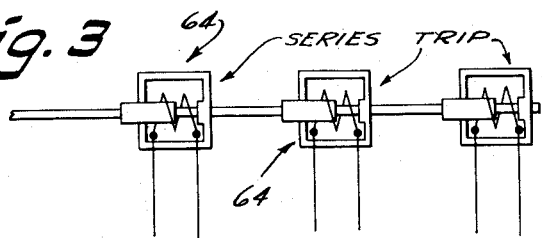
Figure 3 is a fragmentary view showing a further form that the invention illustrated in Figure 2 may take, such view illustrating the use of three series trip coils in place of two series trip coils and a ground fault coil.

It is obvious that the zero sequence relay or ground fault trip means 63 could be replaced by a series trip means 91 as shown in Figure 3 and if this were done, it is of course to be understood that the additional series trip means 91 would be connected in series in the center phase line of Figure 2 and that the three current transformers 61 of Figure 2 would be omitted.

It is to be understood that no attempt has been made in the disclosure to show how the several switch sections or other parts of the apparatus are insulated from each other. It is to be understood that any suitable or well known means can be employed. It is also to be understood that no particular attempt has been made to show guiding means for certain of the parts, though it is obvious that any suitable guiding means could be employed.

It will be seen that novel forms of circuit interrupters have been provided by this invention in which the overload trip means of the circuit interrupter is employed in conjunction with the test switch or auxiliary or probing switch for testing for faults in the load circuit and that in all forms of the circuit interrupter disclosed herein, integrating means have been provided for causing the circuit breaker to be locked in open position for a predetermined number of rapidly recurring operations.

Although this invention has been described in considerable detail, it is to be understood that such description is intended as illustrative rather than limiting, as the invention may be variously embodied and is to be interpreted as claimed.

We claim:

1. A circuit breaker arranged to be connected between a supply circuit and a load circuit, said circuit breaker comprising main switch means controlling the connection of the supply circuit to the load circuit, auxiliary switch means, switch opening means for causing opening of said main and auxiliary switch means, current actuated trip means responsive to overload in said load circuit controlling the opening of said circuit breaker, automatically acting current actuated switch closing means for first closing said auxiliary switch means and thereafter closing said main switch means following an opening due to overload, an impedance connected to said auxiliary switch means for passing a limited current through said trip means and said load circuit to actuate said trip means upon continuing overload, said impedance and trip means being connected in series when said auxiliary switch means is closed and said main switch means is open, and a switch connected in series with said switch closing means and operated by said trip means for rendering said switch closing means inoperable when said trip means is energized.

2. A circuit breaker arranged to be connected between a supply circuit and a load circuit, said circuit breaker comprising main and auxiliary switch means, said main switch means controlling the connection of the load circuit to the supply circuit, current actuated trip means including a coil in series with the load circuit, an auxiliary circuit including an impedance connected between the supply line and the load line and connected in series with the said coil through said auxiliary switch when said auxiliary switch is closed and said main switch is open, automatically acting current controlled switch closing means for successively closing said auxiliary and main switches following opening under overload, and a switch connected in series with said switch closing means and controlled by said trip means for rendering said switch closing means ineffective after the closing of the auxiliary switch and prior to the closing of said main switch upon continued overload, said impedance being bridged by said main switch means when both said switch means are closed.

3. A circuit breaker arranged to be connected between a supply circuit and a load circuit, said circuit breaker comprising main switch means controlling the connection of the supply circuit to the load circuit, auxiliary switch means, switch opening means for causing opening of said main and auxiliary switch means, current actuated trip means responsive to overload in said load circuit controlling the opening of said circuit breaker, automatically acting current controlled switch closing means for first closing said auxiliary switch means and thereafter closing said main switch means following an opening due to overload, an impedance connected to said auxiliary switch means for passing a limited current through said trip means and said load circuit to actuate said trip means upon continuing overload, a switch connected in series with said switch closing means and controlled by said trip means for rendering said switch closing means ineffective when said trip means is actuated, and cumulative means responsive to a plurality of closely successive circuit interrupting operations for holding said last mentioned switch open to thereby render said switch closing means ineffective.

4. A circuit breaker arranged to be connected between a supply circuit and a load circuit, said circuit breaker comprising main switch means controlling the connection of the supply circuit to the load circuit, auxiliary switch means, a magnetically controlled plunger operatively connected to said main and auxiliary switch means and arranged to open and close said switch means, biasing means biasing said plunger towards switch open position, latch means normally holding said plunger in switch closed position, an energizing coil adapted to move said plunger towards switch closed position, said auxiliary switch being arranged to close prior to the closing of said main switch means, time delay means for delaying the closing motion of said plunger, a closing switch arranged to control the energization of said coil, current actuated trip means controlling said latch means and said closing switch, said trip means being normally connected in series with said load circuit and supply circuit, and an auxiliary circuit including an impedance connected in series with said auxiliary switch means and said trip means for passing a limited current through said trip means and load circuit to actuate said trip means on continued overload.

ANTHONY VAN RYAN.
MAX RIGERT.

REFERENCES CITED

The following references are of record in the file of this patent:

UNITED STATES PATENTS

| Number | Name | Date |
|---|---|---|
| 1,534,724 | McDonald | Apr. 21, 1925 |

FOREIGN PATENTS

| Number | Country | Date |
|---|---|---|
| 12,393 | Netherlands | Jan. 15, 1925 |